United States Patent Office 3,469,663
Patented Sept. 30, 1969

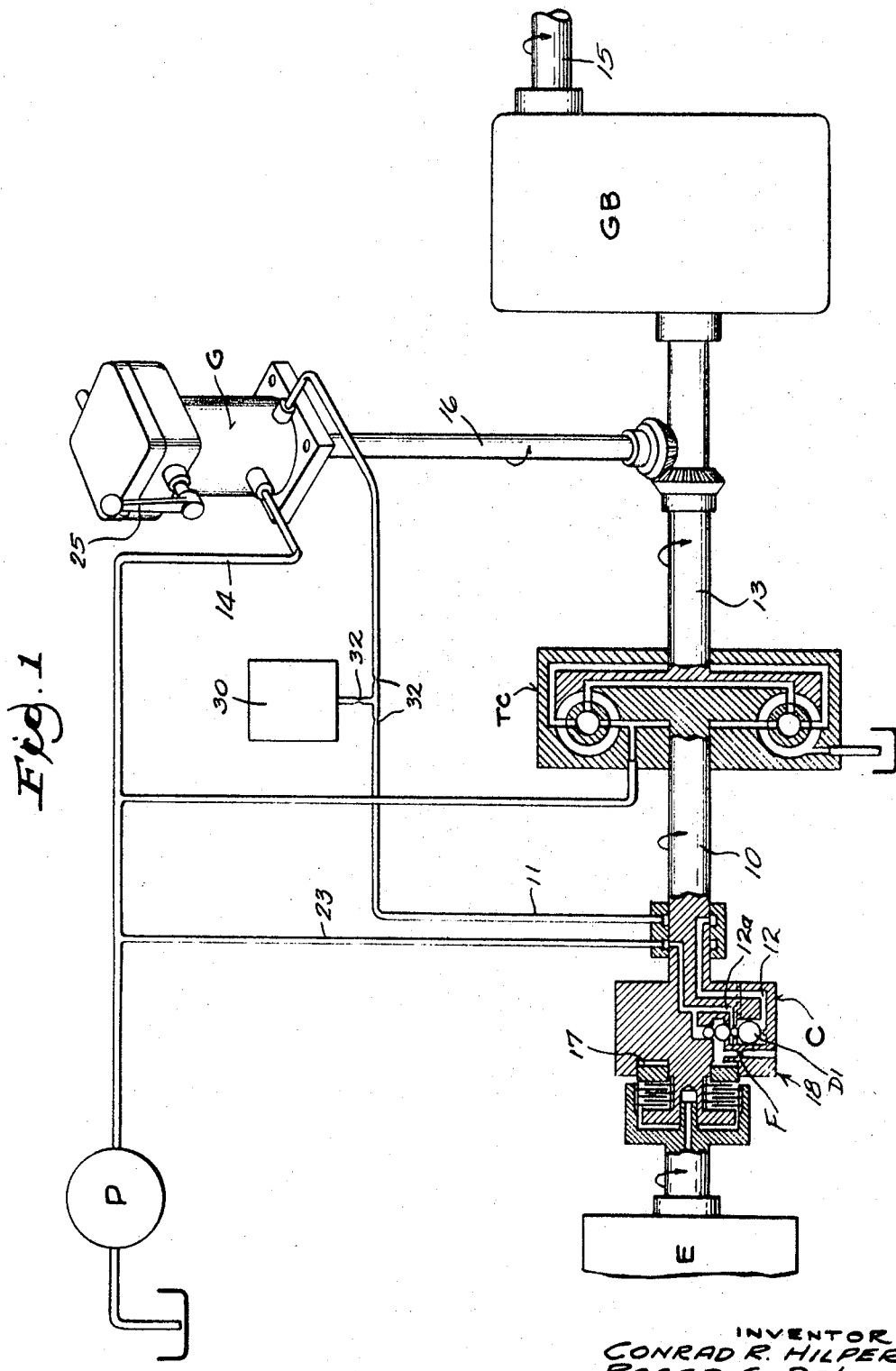

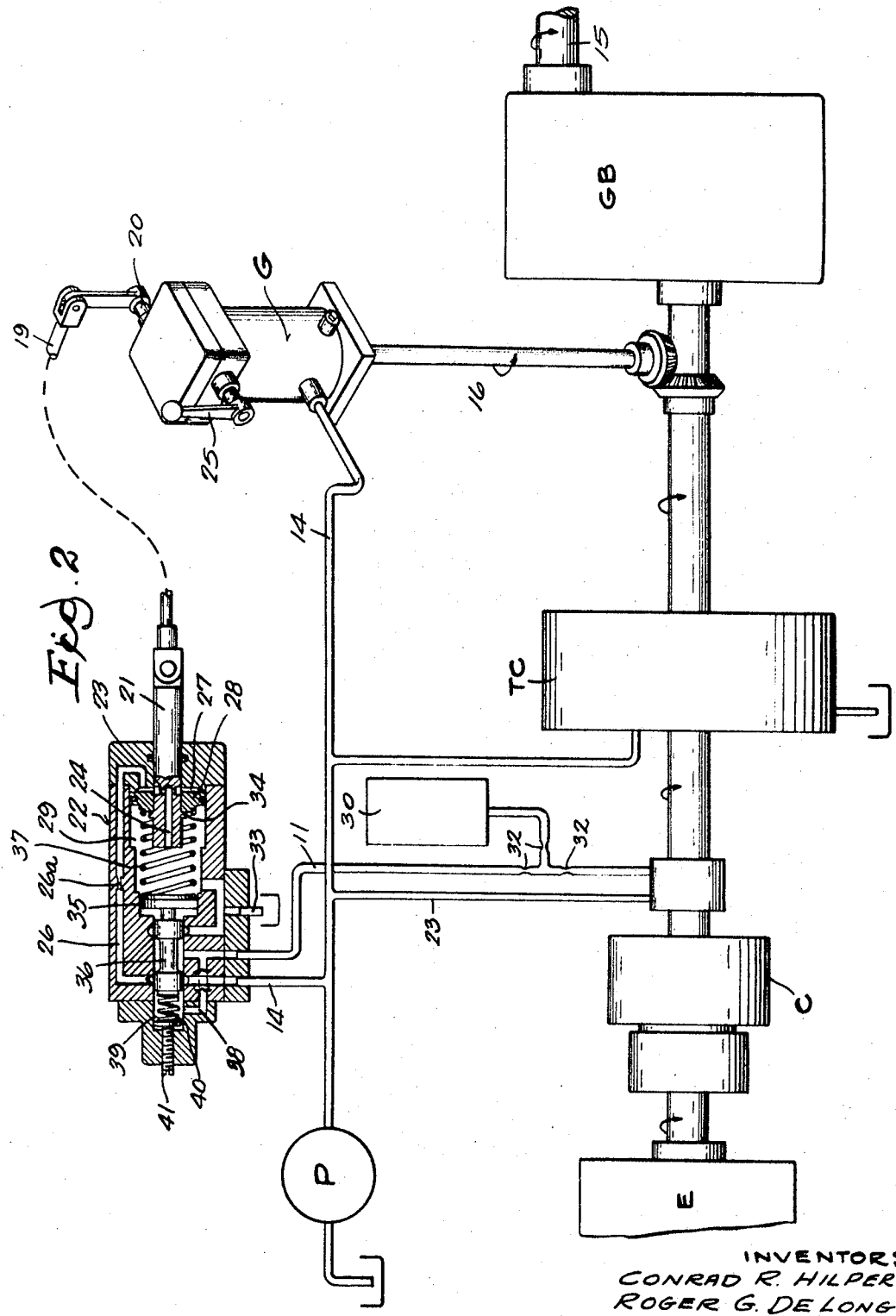

3,469,663
CONSTANT SPEED CLUTCH AND TORQUE CONVERTER TRANSMISSION
Conrad R. Hilpert, Winnebago, Ill., and Roger G. De Long, Racine, Wis., assignors to Twin Disc, Incorporated, Racine, Wis., a corporation of Wisconsin
Filed May 2, 1968, Ser. No. 725,974
Int. Cl. F16d *37/00, 23/10, 43/24*
U.S. Cl. 192—3.33                              6 Claims

ABSTRACT OF THE DISCLOSURE

A power transmission having a governor controlled friction clutch and torque converter for maintaining constant ground speed of a vehicle.

BACKGROUND OF THE INVENTION

The invention pertains to power transmissions of the type having a torque converter that is driven from a source of power, through a friction clutch of the type wherein the output side of the clutch is measured or sensed to control the action of the friction clutch.

Conventional torque converter transmissions of this general type have not been satisfactory for vehicles, such as earth working or construction equipment for example, because of the difficulty in maintaining a constant vehicle ground speed under widely varying load or torque output requirements.

In certain earth moving operations, such as grading, constant ground speed is essential. One specific shortcoming of some of the prior art transmissions has been the inability of the friction clutch to properly control the input to the torque converter, which inability was due, among other things, to the variations in the coefficient of friction within the clutch during engaging periods. As the load was suddenly overcome during the operation of such vehicles, the speed of the vehicle would immediately increase, or conversely, as the load increased, the vehicle speed would drop.

Output responsive, friction clutches of the type utilizable with the present invention, for example, are shown and described in the U.S. Patents 3,352,395, issued Nov. 14, 1967; 3,358,796, issued Dec. 19, 1967, both of which are output speed responsive clutches having centrifugally operated valve means, or the U.S. Patent 3,360,087, issued Dec. 26, 1967, and which is an output torque responsive friction clutch. All of the above patents have been assigned to an assignee common with the present application.

SUMMARY OF THE INVENTION

A power transmission for a vehicle such as a grader, tractor or the like, including a friction clutch of the type which is controlled by a condition at its output, such as to its speed or torque, and in which the output sensitive clutch is located ahead of and is connected to a torque converter for driving the latter, and a governor is connected between the output of the torque converter and the said output sensitive clutch, whereby the input to the torque converter is set by the clutch in accordance with the power requirement of the load, to maintain a constant ground speed of the vehicle.

These and other objects and advantages of the present invention will appear hereinafter as this disclosure progresses, reference being had to the accompanying drawings.

BRIEF DESCRIPTION OF THE DRAWINGS

FIGURE 1 is a schematic diagram of a power transmission embodying the present invention, using a hydraulic connection between the governor and output sensitive clutch;

FIGURE 2 is a view similar to FIGURE 1 but using a mechanical drive to a separate regulator valve for controlling fluid to the output sensitive clutch.

DESCRIPTION OF THE PREFERRED EMBODIMENT

The power transmission of the present invention receives its power from a conventional power source, such as an internal combustion engine E which is mounted on the vehicle (not shown) and delivers power to the input side of an output sensitive clutch C, which may be of the type shown and described in detail in the aforesaid patents. It is believed sufficient to say for purposes of this disclosure, that the clutch is engaged or disengaged in accordance with the output of the clutch as measured at the clutch output member 10. Thus, the rotational speed or the torque being delivered by the clutch can be sensed and used to cause either engagement or disengagement of the hydraulically actuated friction plates of the clutch, to in turn maintain the speed or torque output of the clutch as a preselected value. The fluid to so control the engagement of the friction clutch plates enters the clutch via conduit 11, from a governor G.

A torque converter TC is connected downstream to the clutch C and is conventional and may be of the type shown and described in the U.S. Patent 3,360,935 which issued to Schneider on Jan. 2, 1968. The output shaft 13 of the torque converter is connected and furnishes power to the change speed gear box GB. The gear box GB may be of the type shown in the co-penending U.S. application, Ser. No. 615,575, filed Feb. 13, 1967, by Krawczyk et al., now Patent No. 3,425,293, and assigned to an assignee common with the present invention. With respect to the gear box, it is believed sufficient to say that it may comprise a series of hydraulically operated, duplex clutches and gears which provide a multiplicity of speed changes in both forward or reverse directions.

The gear box in turn would be connected by its output shaft 15 to the driving ground wheels (not shown) of the vehicle with which the present invention is utilized.

The governor G is operatively connected by a suitable mechanical connection 16, between the output shaft 13 of the torque converter TC and the clutch C as shown either in FIGURE 1 or FIGURE 2, as will appear. The governor could also be connected to the output shaft 15 of the gear box, or elsewhere at the output side of the torque converter.

The governor may be anyone of several different types, such as a centrifugal weight type that receives fluid from the high pressure fluid supply line via conduit 14, and controls and regulates the flow of pressure fluid to the clutch control means 18 via the conduit 11. The governor functions to control the flow of fluid to the control means 18 in accordance with the output rotational speed of the torque converter, as measured by the mechanical connection 16 between the output of the converter and the governor. Thus the clutch is actuated in accordance with the selected ground speed of the vehicle. For example, when the output speed of the torque converter drops, the governor acts to admit more fluid to the hydraulic actuating chamber 17 of the friction clutch plates, thus causing additional clutch engagement and consequent additional power to the converter, thereby bringing the speed of the vehicle back up to the preselected value.

In the FIGURE 1 embodiment, the governor is hydraulically connected directly to the clutch by conduit 11, delivering control fluid through the control passage 12 and to the ball valve element D1 of the clutch output sensitive control means 18 to vary clutch engagement.

In the FIGURE 2 embodiment, the governor is mechanically connected via linkage 19 connected between its control shaft 20 and the stem 21 of a fluid control valve 22.

The clutch in FIGURES 1 and 2 is shown as having a separate passage 12a for the constant supply of high pressure fluid from conduit 23 and pump P, thus being a two pressure system as taught in the aforesaid Patent No. 3,358,796 (FIGURE 6) and described therein. A fluid bleed orifice F bleeds fluid from chamber 17 at all times.

In either embodiment, high pressure fluid is fed to the inlet side of the governor via line 14. The governor is manually set by the operator handle 25.

The governor itself is conventional and may be a "Woodward" governor, model SG, lever-fuel control, made by the Woodward Governor Company of Rockford, Ill., and described, for example, in U.S. Patent 2,371,157 of Mar. 13, 1945.

The construction and specific operation of the fluid control valve 22, as shown in the FIGURE 2 embodiment, will now be described.

The stem 21 of the valve has a series of radial holes 23 which connect with the axial port 24. When pressure fluid is delivered via line 14 to the valve, it also flows through passage 26 in the valve body to the chamber 27 behind the piston 28. An orifice 26a is located in passage 26. When the stem is in the position shown in FIGURE 2, the fluid then passes from the large interior chamber 29 of the valve body and out port 33 in the valve body and to the sump.

The piston 28 bears against the stop 34 fixed on the stem, but is free to slide in the other direction on the stem.

Assume the governor requires fluid pressure to be applied to the clutch and shifts stem 21 to the left sufficiently so that axial port 24 of the stem is blocked by abutment against the enlarged end 35 of the valve spool 36. Under these circumstances, pressure fluid through orifice 26a causes the follower piston 28 to follow the stem 21 to the left until the holes 23 in the stem allow that pressure fluid to escape via port 33 to the sump. The piston 28 has compressed the large spring 37 which in turn shifts the spool 36 to the left, permitting high pressure fluid to flow to conduit 11 and to the clutch. The pressure fluid in conduit 11 is also fed back via passage 38 to the left end (FIG. 2), to chamber 39 of the spool valve and this pressure in chamber 39 eventually rises to overcome the bias of the large spring 37 and the spool 36 shifts to the right, thus partially or completely closing the fluid flow from conduit 14 to conduit 11.

In this manner, the fluid pressure in conduit 11 at all times is an exact linear function of the compression in large spring 37. Changes in downstream fluid flow in conduit 11 do not cause any pressure changes in conduit 11, but only an adjustment in the opening of the spool valve to equal the flow demand.

Assume the governor should require a reduction in the fluid pressure to be applied to the clutch, and moves the stem 21 to the right, as viewed in FIGURE 2, carrying the follower piston 27 along with it. Fluid pressure in conduit 11 shifts the spool to the right, thus blocking fluid flow from conduit 14 to conduit 11, and permitting fluid flow from conduit 11 to the sump via port 33, thus releasing the clutch by the required amount.

The small spring 40 in chamber 39, which is adjustably set by screw 41, functions only to permit the spool to be biased in the "on" or "off" positions by a small adjustable amount, regardless of the stem 21 being in the extreme right hand position.

In order to prevent "hunting" and otherwise maintain stability of the control system under certain conditions, it may be necessary to provide a stabilizing means 30, for example, between the governor and clutch, and which means functions to dampen or delay the actuation of the system. This stabilizing means, in the control pressure line of the clutch, may consist of a hydraulic accumulator as indicated, having three orifices 32 in the conduits as shown.

With the present invention, the governor feeds the output sensitive clutch, and the setting of the governor can be selected to maintain a constant rotational speed of the converter output, for example, by causing clutch engagement as the transmission output speed decreases. As the output speed of the transmission tends to drop, the clutch is engaged and the torque automatically increases the output shaft speed until the clutch disengages again.

What is claimed is:

1. A power transmission for maintaining constant ground speed of a vehicle comprising; a power source; an output sensitive, hydraulically actuated, friction clutch having control means sensitive to clutch output for controlling clutch engagement, said clutch connected to and driven from said power source; a torque converter driven by said clutch and having an output member connected to a change speed gear box box for driving the latter; and a governor operatively connected to the output side of said torque converter for sensing the output speed thereof and also connected to said clutch for controlling the flow of actuating fluid to the hydraulically actuated clutch in accordance with the output speed of said converter, whereby said clutch controls the power input to said torque converter to maintain the output speed of the converter constant.

2. The transmission as described in claim 1 including a source of pressure fluid connected to said governor, and a control fluid conduit between said governor and said clutch.

3. A transmission as defined in claim 2 including, system stabilizing means in said fluid conduit for stabilizing the operation of said transmission.

4. A transmission as set forth in claim 1 including a fluid control valve between said governor and said clutch, said valve actuated by said governor and having a fluid conduit connection with said clutch for admitting control fluid pressure to said clutch.

5. A transmission as defined in claim 4 including, system stabilizing means in said fluid conduit for stabilizing the operation of said transmission.

6. A power transmission for maintaining constant ground speed of a vehicle comprising; a power source; an output sensitive, hydraulically actuated, friction clutch having control means sensitive to clutch output for controlling clutch engagement, said clutch connected to and driven from said power source; a torque converter driven by said clutch and having an output member connected to a change speed gear box for driving the latter, a governor operatively connected at the output side of said torque converter and also having a control fluid conduit connected to said clutch for controlling the flow of actuating fluid to the hydraulically actuated clutch in accordance with the output speed of said converter, and system stabilizing means in said fluid conduit to said clutch, whereby said clutch controls the power input to said torque converter to maintain the output speed of the converter constant.

References Cited

UNITED STATES PATENTS

| | | | |
|---|---|---|---|
| 2,770,147 | 11/1956 | Mallinger | 192—3.33 X |
| 3,202,018 | 8/1965 | Hilpert | 192—3.33 X |
| 3,324,983 | 6/1967 | Snog et al. | |
| 3,358,796 | 12/1967 | Hilpert | 192—3.33 |

BENJAMIN W. WYCHE III, Primary Examiner

U.S. Cl. X.R.

74—732; 137—49; 192—104